Nov. 17, 1959 M. J. LARSEN 2,913,525

SECRET COMMUNICATING SYSTEM

Filed July 12, 1949 3 Sheets-Sheet 1

| | | | | | | | | | | | | |
|---|---|---|---|---|---|---|---|---|---|---|---|---|
| INTERVAL | 1 | 2 | 3 | 4 | 5 | 6 | 7 | 8 | 9 | 10 | 11 | 12 |
| DELAY | 0 | 5 | 9 | 4 | 10 | 3 | 9 | 2 | 8 | 1 | 7 | 2 |
| POSITION | 1 | 7 | 12 | 8 | 15 | 9 | 16 | 10 | 17 | 11 | 18 | 14 |

INVENTOR.
MERWIN J. LARSEN

BY Albert R. Hodges
ATTORNEY

Nov. 17, 1959 M. J. LARSEN 2,913,525

SECRET COMMUNICATING SYSTEM

Filed July 12, 1949 3 Sheets-Sheet 2

INVENTOR.
MERWIN J. LARSEN
BY Albert R. Hodges
ATTORNEY

INVENTOR.
MERWIN J. LARSEN

BY Albert R. Hodges
ATTORNEY

United States Patent Office 2,913,525
Patented Nov. 17, 1959

2,913,525

SECRET COMMUNICATING SYSTEM

Merwin J. Larsen, Villa Park, Ill., assignor, by mesne assignments, to General Dynamics Corporation, a corporation of Delaware Application July 12, 1949, Serial No. 104,235

4 Claims. (Cl. 179—1.5)

This invention relates to secret communication systems, and more particularly to systems for such communications which are adapted to provided secrecy both against casual interception and against deciphering which could result in later understandability of the transmitted intelligence.

It is well known that a voltage wave varying in time to represent intelligence, as for example speech, may be conveyed from a transmitter to a receiver by means of a series of discrete samples of the amplitude of the voltage wave, provided the interval between these samples is not too great with respect to the frequency of the intelligence signal to be transmitted and provided the samples are reproduced at the receiver with their original order and spacing. It has been found in practice that the maximum space separation of the samples is determined primarily by the maximum rate of change of the voltage wave to be transmitted, that is, by the amount of detail in the voltage wave to be transmitted. Under optimum conditions, the frequency of sampling should be not less than approximately twice the maximum frequency in the intelligence signal which is to be transmitted. For a voice communication system, for example, a sampling rate of 5000 times per second is adequate to transmit frequencies up to approximately 2500 cycles per second. Each sample need only be of sufficient duration to establish the amplitude of the intelligence voltage wave at the sampling instant. In practice, the duration of the transmitted pulses is chiefly determined by bandwidth considerations.

The discrete amplitude samples may be used to amplitude modulate a pulse train having a pulse repetition rate equal to the sampling rate. The pulse train can then be considered a sub-carrier which is modulated by the intelligence samples, the sub-carrier itself being used to modulate the carrier wave of the transmitter. While there are several ways in which the pulse train can be modulated by the intelligence signal, a convenient one to consider for the present purposes is pulse amplitude modulation, in which the height of each pulse is varied from pulse to pulse in accordance with the discrete samples. While it is true that the wider each pulse is the less the bandwidth required up to the point where the bandwidth required to transmit the space between adjacent pulses becomes the determining factor, this separation space is essential in order to avoid crosstalk or undesired interaction between adjacent pulses. Crosstalk will be at a minimum when the trailing edge of one pulse does not extend sufficiently far to affect the leading edge of the following pulse.

Transmitting intelligence from a transmitter to a receiver in accordance with the principles outlined above will provide a system with minimum bandwidth requirements, but devoid of any provisions for secrecy. The problem for which the present invention provides a solution is to transmit such modulated pulses in a manner effectively preventing their interception and reconversion to a signal corresponding with the original intelligence signal. It is a principal object of the present invention, therefore, to provide an improved secret communication system.

Another object of the present invention is to provide a secret communication system which requires a relatively narrow bandwidth.

An additional object of the present invention is to provide a secret communication system having a variable factor which may be changed at random intervals during the transmission of intelligence for the purpose of rendering even more difficult the deciphering of the transmitted intelligence.

Still another object of the present invention is to provide a secret communication system in which the apparatus required is compact and of light weight.

In accordance with the present invention, the intelligence signal wave is sampled periodically at suitably spaced intervals. This provides a series of discrete samples of the intelligence signal wave. These samples are divided into groups or transposition frames of equal durations, and each sample within the group or frame is subjected to a different time delay. The delayed groups of samples are then combined to form a periodic series. This series is then transmitted, either directly or indirectly as for example by employing it to modulate a carrier wave or a pulse train, to the receiver. At the receiver, the received series of samples is again broken into groups corresponding in time duration with the groups formed at the transmitter, and the samples of these new groups are then subjected to individual delays before being recombined to form a continuous series corresponding in sequence to the original series of samples at the transmitter. This recombined series of samples is utilized at the receiver to reconstruct a substantially exact replica of the original intelligence signal as applied to the transmitter.

Concurrently, with the transmission of the rearranged groups of samples from the transmitter to the receiver, suitable synchronizing signals are transmitted for the purpose of maintaining the receiver in synchronism with the transmitter, with respect to both the time spacing and the respective delays of the several groups of samples, thereby enabling the combined groups to be sorted out and recombined in the proper order and at the proper time in the receiver.

Any desired arrangement may be employed to link the transmitter and the receiver together. For example, the output at the transmitter may serve to modulate or control a transmitter of ultrahigh-frequency energy, and a suitable receiver and demodulator provided at the receiving end. Instead of a radio link, it is within the scope of the present invention to convey coded intelligence to a remote point by a wire line, a transmission line, or a coaxial line.

The above and other objects and features of the present invention will be better understood by reference to the following description taken in connection with the accompanying drawings, in which.

Figure 1:
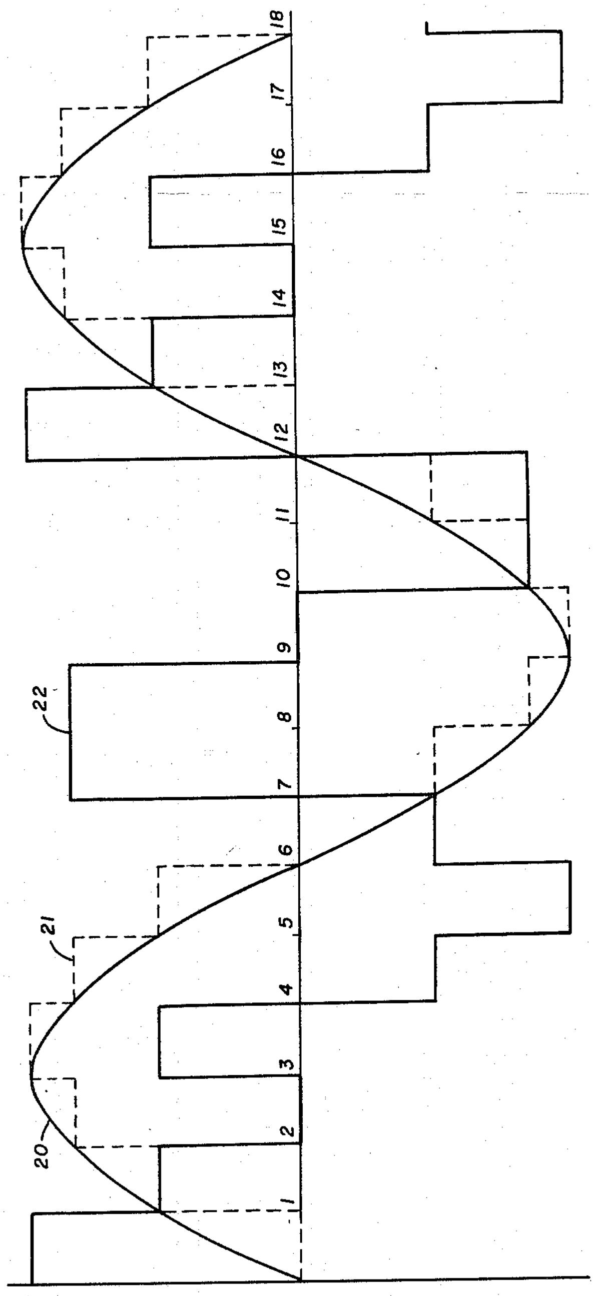
Fig. 1 is a graph illustrating the principles of the invention.

The principles of the present invention will be better understood by reference to Fig. 1 of the drawings, the intelligence signal to be transmitted being represented by the curve 20 which, for purposes of example only, is shown as one and one-half cycles of a sinusoidal wave. It will be understood, of course, that curve 20 could assume any other desired shape without departing from the scope of the present invention. In this figure of the drawings, it is assumed that the sampling rate is twelve times the frequency of the intelligence wave and that, accordingly, sampling takes place every 30 degrees, as indicated by the reference numerals 1–18 disposed at the beginning of the corresponding sampling interval.

The step function which is obtained by sampling wave 20 at intervals 1–18 is depicted by the broken-line curve 21. As will be apparent, the value of this curve corresponds during each sampling interval with the value of wave 20 at the sampling instant initiating each such interval. Each sampling interval is subjected to a different delay, as indicated for example by the tabulation in this figure. In this particular example, the first sampling interval is subjected to a delay corresponding to zero; interval 2 is subjected to a delay corresponding to the time duration of five sampling intervals; interval 3 is subjected to a delay corersponding to the duration of nine such intervals; and so on up to a maximum delay of eleven intervals. The resultant position of each sampling interval after being subjected to its individual delay is also indicated in the tabulation. Curve 22 indicates the resultant waveform after each segment has been permuted. This is the waveform which is transmitted to the receiver. At the receiver, the process outlined immediately above is reversed, and a wave closely corresponding to curve 20 of Figure 1 is automatically produced.

It will be understood that the particular delays applied to each of the twelve sampling intervals may be varied to provide a large number of different codes. The total number approaches factorial (12–1), since a sample cannot be transmitted in the same interval in which sampling takes place. Not all of these possible codes are usable in a practical secret communication system, since some of them do not provide sufficient scrambling to insure unintelligibility if intercepted.

Figure 2:
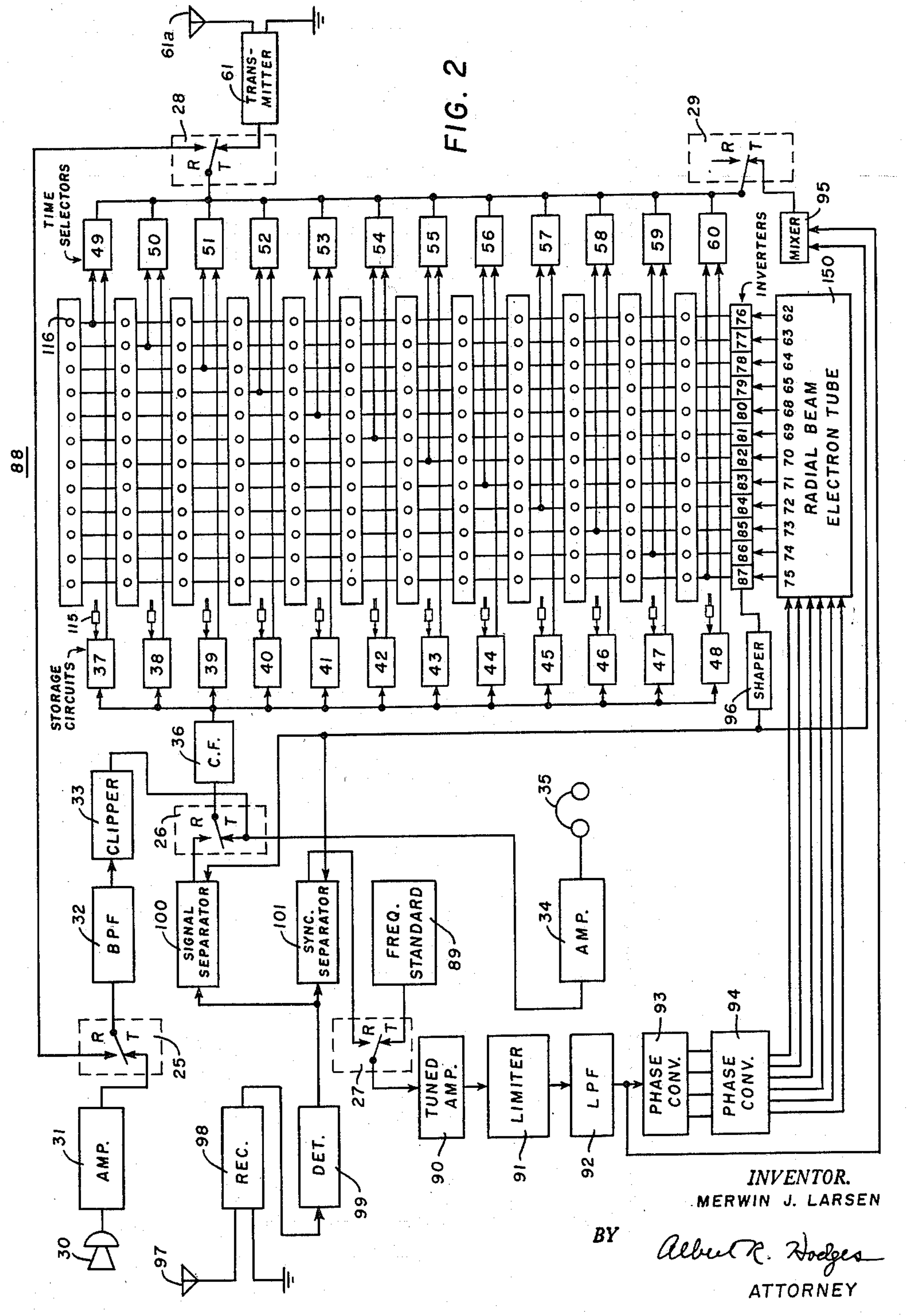
Fig. 2 is a schematic diagram, partly in block form, representing a transmitting and receiving unit suitable for use at either terminus of a system in accordance with the present invention.

In Fig. 2 of the drawings there is shown a schematic diagram, partly in block form, of a transmitting and receiving unit suitable for use at either terminus of a system in accordance with the present invention. Transmit-receive switches 25, 26, 27, 28 and 29 are ganged for simultaneous operation in any suitable manner, as for example by a conventional "push-to-talk" button arranged to energize a relay during transmission. These switches are shown in their transmitting positions, since the arrangement and operation of the system during transmission will first be discussed.

A suitable transducer, as for example a microphone 30, is connected to a conventional audio-frequency or microphone amplifier 31, the output of which in turn is fed through switch 25 to a band-pass filter unit 32 which may, for example, have a pass band of 250 to 2500 cycles per second. The output of filter unit 32 is connected to a peak clipper unit 33, the purpose of which is to improve the utilization of the transmitter and to simplify the circuit requirements of subsequent units.

The output of clipper unit 33 is supplied to a suitable output amplifier 34 feeding headphones 35 in order to provide a sidetone of suitable amplitude during transmission, and is also fed through switch 26 to a cathode follower unit 36. The relatively low-impedance output of unit 36 supplies a plurality of storage circuits 37–48, which are respectively connected to time selector units 49–60. The common output of units 49–60 is fed through switch 28 to a transmitter 61 of conventional design, the output of which energizes a suitable antenna 61*a*. The intelligence signal path from microphone 30 to transmitter 61 has now been completely outlined.

For the purpose of accomplishing coding and decoding, there is provided a source of equally spaced negative voltage pulses, as for example a radial beam electron tube 150 having a plurality of anode connections 62–75, which in turn respectively supply inverter units 76–87. The positive output pulses from units 76–87 are supplied respectively to time selectors 49–60, so that each of these devices is energized in turn.

To provide the desired delay for each sampling interval, each of storage circuits 37–48 must be caused to sample and store an instantaneous value of the intelligence signal wave as delivered by cathode-follower unit 36 at the proper time. This may be accomplished by means of a plugboard 88, which is so arranged that each of units 37–48 may be supplied with a positive pulse from any one of inverter units 76–87, merely by inserting the associated plug in the proper jack. The positive voltage pulse from the inverter unit renders the storage circuit operative, so that it produces a positive pulse corresponding in amplitude to the stored sample in the associated storage circuit.

To furnish synchronization signals and the rotating electrostatic field required by radial beam electron tube 150, there is provided a frequency standard 89 which may, for example, operate at 420 cycles per second. The output of this standard is fed through switch 27 to a tuned amplifier 90 which may be broadly tuned to 420 cycles per second, for example. Connected to amplifier 90 is an amplitude limiter unit 91, which in turn feeds a low-pass filter 92 having a cutoff frequency of 600 cycles per second, for example, and serving to eliminate undesired harmonics of the 420-cycle wave.

A portion of the output of filter 92 drives cascaded phase converters 93 and 94, the first of which changes single-phase energy to four-phase, and the second of which converts four-phase to six-phase energy. The output of converter 94 is fed to radial beam electron tube 150, and serves to energize its rotating field.

Another portion of the output of filter 92 is supplied to a synchronizing signal mixer unit 95, to which is also supplied a voltage developed in a circuit common to inverters 76–87 and shaped by a shaper unit 96. The output of mixer unit 95, which is the synchronizing signal to be transmitted, comprises the output wave from unit 92 sampled at intervals falling within the time periods lying between the main sampling intervals. Thus there is no conflict between the intelligence signal and the synchronizing signal when the latter is supplied, through switches 29 and 28, to transmitter 61.

The arrangement and operation of the system of Fig. 2 for receiving will now be considered. Switches 25, 26, 27, 28 and 29 are assumed to be in their receiving positions. The incoming signal wave is intercepted by an antenna 97 and fed to a receiver 98 and then to a detector unit 99. The output of detector unit 99 is supplied to intelligence signal separator 100 and to synchronizing signal separator 101. In addition to the detected incoming signal, the output of shaper 96 is supplied to separators 100 and 101.

The separated intelligence signal passes through switch 26 and cathode-follower unit 36 to storage circuits 37–48 and time selectors 49–60, which function in the manner described above in connection with operation as a transmitter to provide a reconstruction of the intelligence signal as originally supplied to the transmitter at the remote terminus, assuming that the connections on plugboard 88 are suitably arranged. This reconstructed signal wave is supplied, by means of switches 28 and 25, to band-pass filter 32, clipper unit 33, amplifier 34, and headphones 35.

The separated synchronizing signal passes through switch 27 to tuned amplifier 90, limiter 91, low-pass filter 92, and phase converters 93 and 94, so that the energy supplied to the rotating field of radial beam electron tube 150 is in phase with the corresponding field energization at the transmitting terminus. The particular details of the intelligence signal and synchronizing signal separators 100 and 101 do not form a part of the present invention.

Figure 3:
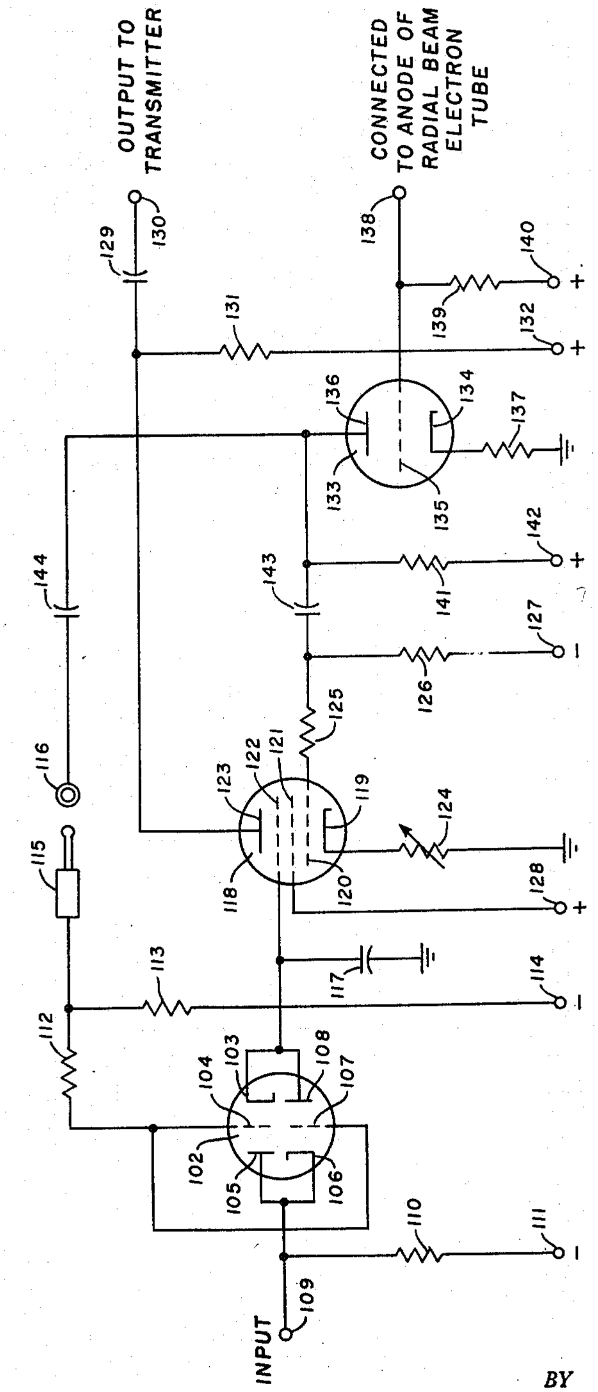
Fig. 3 is a schematic diagram of a portion of the system of Fig. 2.

Referring now to Fig. 3 of the drawings, there is shown a schematic circuit diagram of a storage circuit, time selector and inverter such as are represented respectively by blocks 37, 49 and 76 of Fig. 2, for example. The storage circuit of Fig. 3 comprises an electron discharge tube 102 of the dual triode type, one triode section including a cathode 103, a control electrode 104 and an anode 105, and the second triode section consisting of a cathode 106, a control electrode 107 and an anode 108. These triode sections are connected in opposed parallel relation. Anode 105 and cathode 106 are connected together and to an input terminal 109. A resistor 110 is connected between input terminal 109 and a suitable source of negative potential 111.

Control electrodes 104 and 107 are connected together and through series-connected resistors 112 and 113 to a suitable source of negative potential 114. The junction of resistors 112 and 113 is connected to a plug 115 adapted to engage a jack 116, the latter two components forming a part of plugboard 88 of Fig. 2. Cathode 103 and anode 108 are connected together and grounded through a capacitor 117. The apparatus thus far described comprises the storage circuit, such as is represented by block 37 of Fig. 2.

The time selector portion of the arrangement of Fig. 3 comprises an electron discharge tube 118 preferably of the pentode type, having a cathode 119, a control electrode 120, a screen grid 121, a suppressor grid 122, and an anode 123. Cathode 119 is grounded through an adjustable resistor 124. Control electrode 120 is connected through series-connected resistors 125 and 126 to a suitable source of negative potential 127. Screen grid 121 is connected to a suitable source of positive potential 128. Suppressor grid 122 is connected to the ungrounded terminal of capacitor 117. Anode 123 is connected through a capacitor 129 to an output terminal 130, and through a resistor 131 to a suitable source of positive potential 132. The outputs of time selectors 49–60 are mixed across resistor 131.

The inverter comprises an electron discharge tube 133, shown as a triode, having a cathode 134, a control electrode 135, and an anode 136. Cathode 134 is grounded through a resistor 137. Control electrode 135 is connected to a terminal 138, which in turn is connected to an anode of radial beam electron tube 150 of Fig. 2, and through a resistor 139 to a suitable source of positive potential 140. Anode 136 is connected through a resistor 141 to a suitable source of positive potential 142. A capacitor 143 is connected between anode 136 and the junction of resistors 125 and 126, and a capacitor 144 is connected between anode 136 and jack 116.

In operation, discharge tube 102 is normally cut off due to the bias potential applied to control electrodes 104 and 107. When control electrode 135 of discharge tube 133 is driven negative due to the action of radial beam electron tube 150 (Fig. 2), anode 136 goes positive and a positive pulse is applied through capacitor 144, plug-jack 115, 116 and resistor 112 to control electrodes 104 and 107, rendering tube 102 conductive. Capacitor 117 is then permitted to assume a charge proportional to the value of the intelligence signal voltage which is present between input terminal 109 and ground. This charge is applied directly to suppressor grid 122 of discharge tube 118, which is normally maintained in a non-conductive condition by the negative bias applied to control electrode 120.

The positive swing of anode 136 of discharge tube 133 is also applied, by means of capacitor 143, to control electrode 120 of discharge tube 118, thereby rendering this tube conductive and causing anode 123 to make a negative swing. Due to the action of suppressor grid 122, this swing is proportional to the charge on capacitor 117, and it is passed on by means of capacitor 129 to transmitter 61 (Fig. 2).

It will be apparent, therefore, that during the time interval represented by electron flow in the anode circuit 64 of radial beam electron tube 150, the intelligence signal wave at input terminal 109 is sampled and caused to charge capacitor 117. Since plug 115 connected to storage circuit 37 is inserted in jack 116 connected to inverter 76 to which time selector 49 is already connected (see Fig. 2), the sample is supplied to switch 28 without any shift in its time position. Any desired time shift, up to twelve sampling intervals, could equally well be obtained by inserting plug 115 in one of the other jacks in the top row of plugboard 88 in Fig. 2.

It will be evident to those skilled in the art that various changes and modifications may be made in the arrangements shown and described without departing from the scope of the present invention. For example, the radial beam electron tube of Fig. 2 may be replaced by a ring circuit time base generator. The plugboard 88 may be provided with any other suitable number of positions, instead of the twelve positions shown by way of example. The plugboard itself could be replaced by a synchronously stepped permuting relay or stepping relay arranged to change the transposition code at predetermined regular or irregular intervals, thereby enhancing the secrecy of communication.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination, a plurality of storage circuits; a source of intelligence signal wave connected to each of said storage circuits; a source of control pulses having a plurality of output leads and operative to furnish a control pulse on each of said output leads in turn, said output leads of said source of control pulses being individually interconnected with said storage circuits in a selected order such that each said storage circuit is enabled during receipt of a control pulse over the said output lead connected thereto to sample said intelligence signal wave, and to store the sample thus obtained; a plurality of gating means each having signal and control input means and an output means, each said control input means being connected to a corresponding one of said output leads, and each said signal input means being connected to the output of a corresponding one of said storage circuits, said input means of said plurality of gating means being connected in parallel, whereby said parallel connection of said output means carries samples of said intelligence signal wave which are individually obtained from said intelligence signal wave and stored by said storage circuits until sequentially taken and passed by said gating means under control of said control pulses to said parallel connection of said output means.

2. The combination of claim 1 to which is added means for changing at will said selected order of interconnection between said output leads and said storage means.

3. The combination of claim 2 in which said changing means is a plugboard.

4. The combination of claim 1 in which the quantity of gating means equals the quantity of storage circuits, and in which there is one output lead of said source of control pulses for each said storage circuit.

References Cited in the file of this patent

UNITED STATES PATENTS

| | | |
|---|---|---|
| 1,369,805 | Hamilton | Mar. 1, 1921 |
| 2,089,639 | Bedford | Aug. 10, 1937 |
| 2,313,209 | Valensi | Mar. 9, 1943 |
| 2,364,210 | Guanella | Dec. 5, 1944 |
| 2,401,464 | Corderman | June 4, 1946 |
| 2,401,888 | Smith | June 11, 1946 |
| 2,403,280 | Hicks | July 2, 1946 |
| 2,406,349 | Buhrendorff | Aug. 27, 1946 |
| 2,467,486 | Krumhansl et al. | Apr. 19, 1949 |
| 2,486,491 | Meacham | Nov. 1, 1949 |
| 2,508,622 | Pierce | May 23, 1950 |
| 2,527,638 | Kreer et al. | Oct. 31, 1950 |

FOREIGN PATENTS

| | | |
|---|---|---|
| 306,407 | Great Britain | May 15, 1930 |